United States Patent
Birdwell et al.

(10) Patent No.: US 7,194,474 B2
(45) Date of Patent: Mar. 20, 2007

(54) METHOD OF PROCESSING TEST INFORMATION

(75) Inventors: Thomas William Birdwell, Middletown, OH (US); Joseph Benjamin Ross, Cincinnati, OH (US); Ronald Cecil McFarland, Cincinnati, OH (US); Christopher Reynolds Hammond, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/727,898

(22) Filed: Dec. 1, 2000

(65) Prior Publication Data

US 2004/0210586 A1  Oct. 21, 2004

Related U.S. Application Data

(60) Provisional application No. 60/168,345, filed on Dec. 1, 1999.

(51) Int. Cl.
  *G06F 17/30* (2006.01)
  *G06F 7/00* (2006.01)
  *G06F 15/16* (2006.01)

(52) U.S. Cl. .................... 707/102; 707/104.1; 709/200
(58) Field of Classification Search ................ 707/100, 707/104.1, 101; 356/241.1; 714/703; 709/200
See application file for complete search history.

(56) References Cited

U.S. PATENT DOCUMENTS

| | | | | |
|---|---|---|---|---|
| 5,628,319 A * | 5/1997 | Koch et al. | ................. | 600/437 |
| 5,920,828 A * | 7/1999 | Norris et al. | ................. | 702/14 |
| 5,946,220 A * | 8/1999 | Lemelson | ................... | 700/273 |
| 6,018,713 A * | 1/2000 | Coli et al. | .................... | 705/2 |
| 6,499,125 B1 * | 12/2002 | Ohta et al. | ................... | 714/734 |
| 6,511,426 B1 * | 1/2003 | Hossack et al. | ............ | 600/437 |
| 6,721,676 B1 * | 4/2004 | Ueda | .......................... | 702/123 |
| 2002/0013857 A1 * | 1/2002 | Kitamura | .................... | 709/245 |

* cited by examiner

*Primary Examiner*—John Cottingham
*Assistant Examiner*—Kuen S. Lu
(74) *Attorney, Agent, or Firm*—William Scott Andes; Armstrong Teasdale LLP

(57) ABSTRACT

An NDE test data record management system is provided. The test data record management system can include a format conversion server, a local archiving server, a cataloging server, an image and data cache server, and an image query and review station.

7 Claims, 2 Drawing Sheets

METHOD OF PROCESSING TEST INFORMATION

CROSS-REFERENCE TO RELATED APPLICATION

This application claims the benefit of priority from U.S. Provisional Application No. 60/168,345, filed Dec. 1, 1999.

FIELD OF THE INVENTION

This invention relates to storage and processing of data, and in particular, to the storage and processing of nondestructive evaluation (NDE) test data.

BACKGROUND OF THE INVENTION

Businesses involved in the design and testing of technical equipment and systems often have a need to generate and store nondestructive evaluation (NDE) test data. Such NDE data can be useful in cases where a defect is detected in a part during the part's service life, or in the event of failure of the part during service. Such NDE test data can include digital images, such as digital images provided by x-ray, ultrasound, or eddy current imaging systems. Such test data can be obtained from a mechanical component which is subjected to cyclic loading in service, and such test data can be useful in detecting cracks or other flaws in the component caused by the cyclic loading. NDE data is also used to detect material defects in newly manufactured components which have not gone into service.

Commercial businesses and government regulators have been interested in establishing a universal NDE data archiving system for several years. Currently, there is no effective means for archiving and retrieving such data from different sources. Instead, numerous, often incompatible "island archives" of NDE data are created by different sources. As a result, data cannot be readily shared between vendors and customers or between suppliers and government agencies. Further, such data cannot be easily incorporated into standard word processing and presentation documents. Typically, when incompatible data is to be shared, a software tool such as a custom file format converter must be developed to enable transfer of data from "party A" to "party B". Unfortunately, this may not permit the same data to be transferred from "party A" to "party C", so that a custom file format converter is required for each such transfer.

Certain test image data generated in the medical arts is formatted in a what is referred to as the DICOM standard. The DICOM format describes a standardized method of assembling medical image data along with all related pertinent data regarding the patient (age, sex, SSN), study (Date, diagnositic system used, part of the body imaged), physician name, diagnostic system (type, imaging parameters, x-ray KV) etc. DICOM integrates all types of information from a diagnositic study into a single digital entity which can be stored, transmitted via computer networks, and displayed or printed using any DICOM compatible display system or printer. DICOM has provisions for dealing with all currently available medical image types.

An introduction to the Digital Image Communication in Medicine (DICOM) standard can be found at the following website: http://www.sbis.epm.br/pepcdrom/apresent/pimagmed/intro.html. A complete copy of the DICOM standard is available at http://idt.net/~dclunie/dicom-status/status.html.

SUMMARY OF THE INVENTION

In one embodiment of the present invention, an NDE test data record management system is provided. The test data record management system can include a format conversion server, a local archiving server, a cataloging server, an image and data cache server, and an image query and review station.

The format conversion server can accept existing data formats (legacy formats) as input, merge image and inspection parameter data, and convert the data to a standard format, referred to hereinafter as a Digital Image Communication Nondestructive Evaluation (DICONDE) format. The DICONDE format can be based, at least in part, on the Digital Image Communication in Medicine (DICOM) format, described above.

In one embodiment, the format conversion server can incorporate a conversion tool in the form of a "conversion definition wizard" which can be interactively taught unfamiliar (previously not translated) data formats so that no special conversion software need be produced to perform the format conversion task. DICONDE to DICOM import interface software can be provided, in combination with a commercially available DICOM image archive system, to store NDE data and preserve the NDE terminology and parameter names inherent in the original data so that they may be available for later needs.

The local archiving server provides storage of the DICONDE data on one or more storage media (e.g. magnetic disk, optical disk, tape). The archive server can comprise a commercially available picture archive system (PACS), such as used in DICOM applications.

An archive database can be used to catalog the location of the data and provide a selection of data parameters for indexing such as part number, part type, and modality (mode of test). Test modalities include, but are not limited to, x-ray, ultrasound, computer aided tomography, digital radiography, infrared thermography, and eddy current (conventional and imaging).

The cataloging server can be used to track data on disks, including data on the local archiving system, data stored at remote sites, and data obtained via a network link to other record management systems. The present invention provides the capability of storing DICONDE images either locally or remotely based on the volume of images being archived. Users who generate a small volume of images may choose to store them at a remote archive to reduce local system cost. Large volume users may find it more economical to purchase and maintain a local archive. The data management system can include software to support either or both types of storeage.

The image query and review station employs the cataloging server to locate desired part test data and receives image data from one or more of the local or remote archiving servers, via network links. The image query function locates the data through the use of the cataloging server. The image review function displays the image along with the most pertinent part and NDE test parameters. The image review function provides access to component and NDE information using standard industrial terminology rather than the medical terminology built into the DICOM data dictionaries.

In another embodiment, the invention comprises a computer, or computer network, and associated software for converting existing NDE test data to a standard format; a computer archiving architecture associated with the computer or computer network for permitting local and remote storage of the test data in the standard format; a computer archive database associated with the computer or computer network for locating data associated with a particular component or type of component; interface software for preserving test terminology; a terminal or workstation for accessing data in the database; a connection to outside computer networks; and data encryption software for transmission of test data across open networks.

In one embodiment, the present invention can include the steps of: providing a predetermined standard data format for NDE test data; converting existing NDE test data to the standard data format; adding the converted NDE test data to a computer database associated with a computer network; and transmitting the converted NDE test data to over the network.

DETAILED DESCRIPTION OF THE INVENTION

One application of the present invention is in the storage and comparison of Non Destructive Evaluation (NDE) data for a particular part or class of parts. In particular, existing (legacy) data is converted to a standard data format. The present application can be used in testing components and parts in various stages of manufacture, including but not limited to billets, forgings, castings, and finished parts. The present application can be used in testing aerospace components and parts, including but not limited to aircraft engine parts such as disks, airfoils, and disk dovetails.

Figure 1:
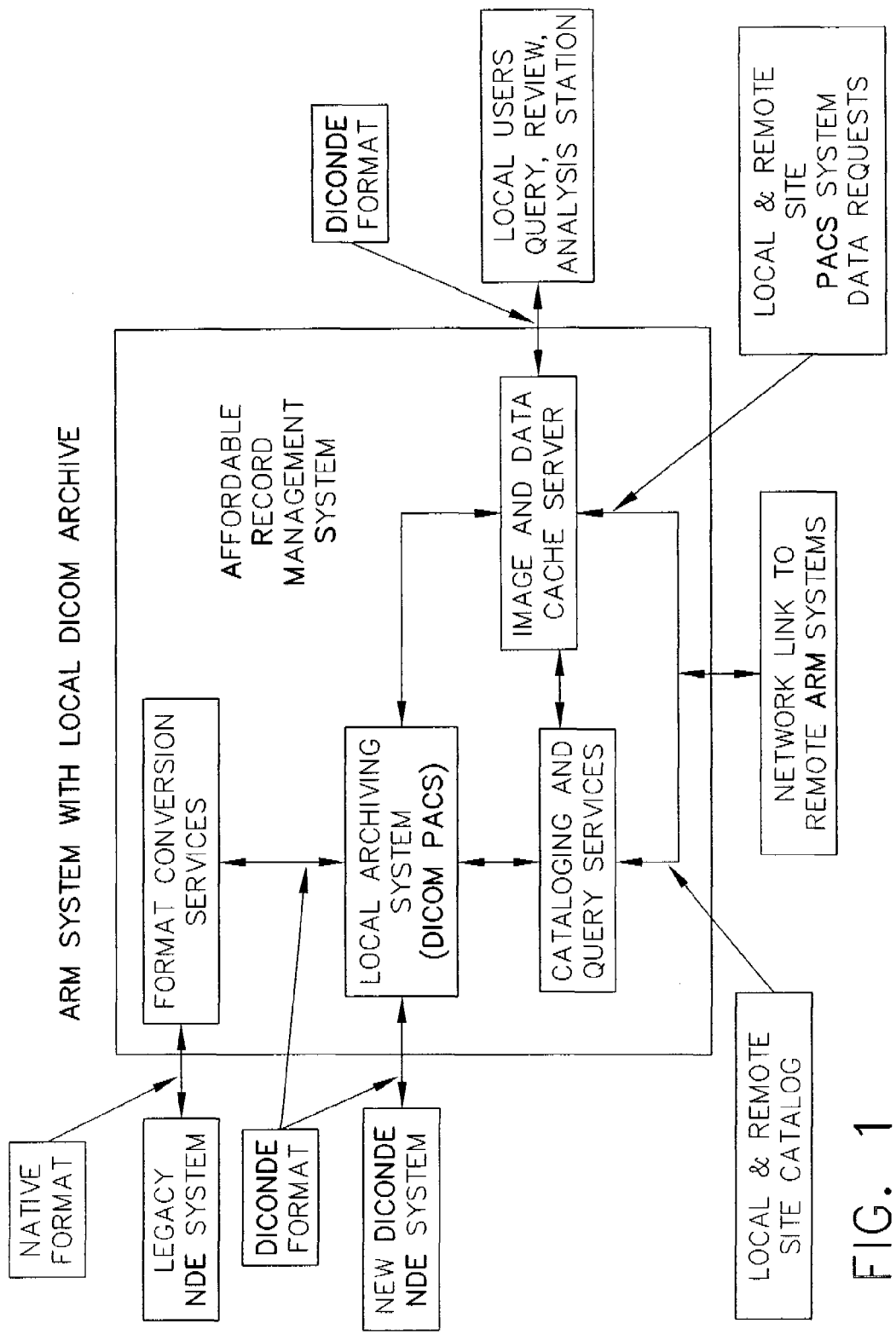
FIG. 1 is a schematic block diagram of a record management system according to the present invention, the record management system comprising a data format conversion server, a local archiving server, a cataloging server, and an image and data cache server.

Referring to FIG. 1, the present invention can comprise an NDE test data record management system which includes a format conversion server, a local archiving server, a cataloging server, an image and data cache server, and an image query and review station.

The format conversion server can accept existing data formats (legacy formats) from existing NDE systems as input. Examples of existing NDE data include, but are not limited to formats such as TIFF file format, ASCII file format and IPDE format. The format conversion server converts the data to a standard DICONDE format. The format conversion server can comprise a conversion tool in the form of a "conversion definition wizard" which can be interactively taught unfamiliar data formats. Accordingly, a unique data format conversion program is not needed for each new data format encountered.

The local archiving server provides storage of the DICONDE data on one or more storage media (e.g. magnetic disk, optical disk, tape). The archive server can comprise a commercially available picture archive system (PACS), such as used in DICOM applications. The present invention can also include DICONDE-DICOM import interface software associated with the local archiving server, so that NDE data can be stored on the commercially available DICOM PACS, while preserving the NDE terminology and parameter names inherent in the original data so that they may be available for later needs.

The local archive server can also be associated with DICONDE format NDE test systems, as indicated in FIG. 1, so that DICONDE format data can be received without need for format conversion.

An archive database can be used to catalog the location of the data and provide a selection of data parameters for indexing such as part number, part type, and modality (mode of test). Test modalities include, but are not limited to, x-ray, ultrasound, computer aided tomography, digital radiography, infrared thermography, and eddy current (conventional and imaging).

The cataloging server can be used to track data on disks, including data on the local archiving system, data stored at remote sites, and data obtained via a network link to other record management systems. The present invention provides the capability of storing DICONDE images either locally or remotely based on the volume of images being archived. Users who generate a small volume of images may choose to store them at a remote archive to reduce local system cost. Large volume users may find it more economical to purchase and maintain a local archive. The data management system can include software to support either or both types of storage.

The image query and review station employs the cataloging server to locate desired part test data and receives image data from one or more of the local or remote archiving servers, via network links. The image query function locates the data through the use of the cataloging server. The image review function displays the image along with the most pertinent part and NDE test parameters. The image review function provides access to component and NDE information using standard industrial terminology rather than the medical terminology built into the DICOM data dictionaries.

In another embodiment, the invention comprises a computer, or computer network, and associated software for converting existing NDE test data to a standard format; a computer archiving architecture associated with the computer or computer network for permitting local and remote storage of the test data in the standard format; a computer archive database associated with the computer or computer network for locating data associated with a particular component or type of component; interface software for preserving test terminology; a terminal or workstation for accessing data in the database; a connection to outside computer networks; and data encryption software for transmission of test data across open networks.

In one embodiment, the present invention can include the steps of: providing a predetermined standard data format for NDE test data; converting existing NDE test data to the standard data format; adding the converted NDE test data to a computer database associated with a computer network; and transmitting the converted NDE test data to other computers on the network.

Figure 2:
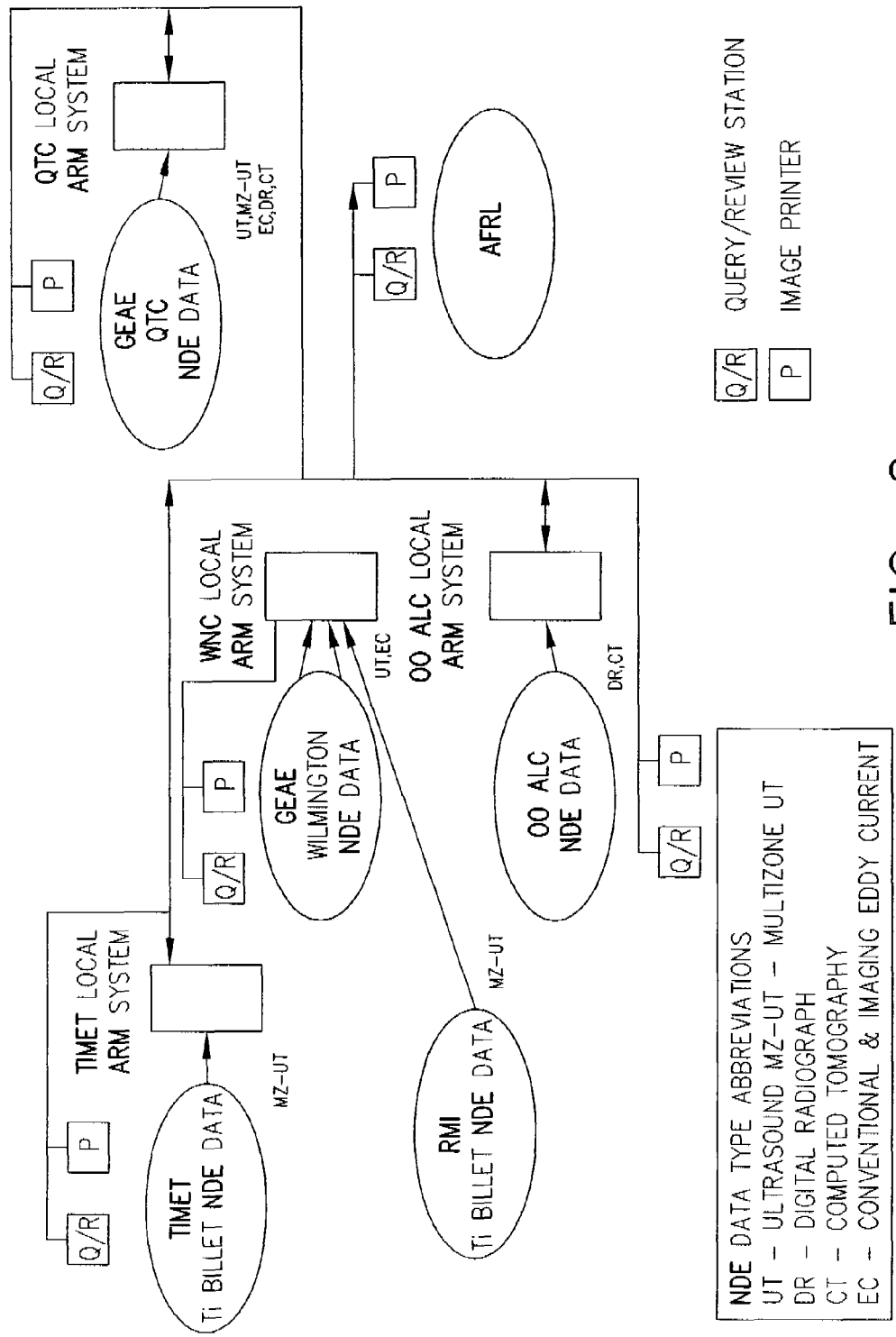
FIG. 2 is a schematic block diagram illustrating a plurality of record management systems, the record management systems connected by a computer network.

FIG. 2 is a schematic block diagram illustrating a plurality of record management systems, the record management systems connected by a computer network. At one of the record management systems can receive NDE test data from multiple sites.

The present invention has been described in connection with a variety of specific forms, embodiments, examples, materials, etc. However, it should be understood that they are intended to be representative of, rather than in any way limiting on, the scope of the invention. Those skilled in the various arts involved will understand that the invention is capable of variations and modifications without departing from the scope of the appended claims.

What is claimed is:

1. A method of managing non-destructive evaluation data comprising the steps of:
   providing a predetermined standard data format for non-destructive evaluation test data;
   converting existing non-destructive evaluation test data including a plurality of different data formats into the standard data format using a conversion tool that is interactively taught un-encountered data formats,
   wherein the plurality of different data formats comprise image data formats and non-image data formats, and
   wherein a unique data format conversion program is not needed for each new data format encountered;
   adding the converted non-destructive evaluation test data to a computer database associated with a computer network;
   transmitting the converted data over the network;
   displaying at least a desired portion of an image; and
   displaying non-destructive evaluation test parameters of the image displayed.

2. A method in accordance with claim 1 wherein the plurality of different data formats comprise at least one of a TIFF format, an ASCII format, and an IPDE format.

3. A method in accordance with claim 1 wherein the standard data format is based at least in part on a Digital Image Communication in Medicine (DICOM) format.

4. A method in accordance with claim 1 wherein adding the converted non-destructive evaluation test data to a computer database comprises storing images on the computer database.

5. A method in accordance with claim 1 wherein transmitting the converted data over the network comprises transmitting images over the network.

6. A method in accordance with claim 1 further comprising locating the converted non-destructive evaluation test data on the first computer database using a cataloging server.

7. A method in accordance with claim 6 wherein locating the converted non-destructive evaluation test data comprises locating an image.

* * * * *